(12) United States Patent
Montagne

(10) Patent No.: US 8,172,431 B2
(45) Date of Patent: May 8, 2012

(54) LUMINAIRE AND REFLECTOR

(75) Inventor: Louis Montagne, Cailloux sur Fontaines (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 251 days.

(21) Appl. No.: 12/596,492

(22) PCT Filed: Apr. 23, 2008

(86) PCT No.: PCT/IB2008/051549
§ 371 (c)(1),
(2), (4) Date: Mar. 24, 2010

(87) PCT Pub. No.: WO2008/129511
PCT Pub. Date: Oct. 30, 2008

(65) Prior Publication Data
US 2010/0182790 A1  Jul. 22, 2010

(30) Foreign Application Priority Data
Apr. 24, 2007 (EP) .................................. 07300977

(51) Int. Cl.
*F21V 7/07* (2006.01)
(52) U.S. Cl. ......... 362/296.05; 362/296.06; 362/296.01; 362/296.07

(58) Field of Classification Search ............. 362/296.05, 362/296.06, 296.07, 296.01
See application file for complete search history.

(56) References Cited

U.S. PATENT DOCUMENTS

| | | | |
|---|---|---|---|
| 4,177,383 A | 12/1979 | Knight | |
| 5,636,917 A * | 6/1997 | Furami et al. | ............... 362/538 |
| 6,457,850 B2 * | 10/2002 | Oyama et al. | ............... 362/517 |
| 2006/0198139 A1 * | 9/2006 | Cheng | ........................... 362/241 |
| 2006/0285347 A1 | 12/2006 | Okada | |

FOREIGN PATENT DOCUMENTS

| | | |
|---|---|---|
| CH | 342540 | 11/1959 |
| DE | 1127834 B | 4/1962 |
| EP | 1855051 A1 | 11/2007 |
| FR | 1229848 | 9/1960 |
| JP | 9213110 A | 8/1997 |

* cited by examiner

*Primary Examiner* — Evan Dzierzynski
(74) *Attorney, Agent, or Firm* — Mark L. Beloborodov

(57) ABSTRACT

The invention relates to a reflector (1) which comprises an ellipsoidal light reflective wall (21) and a light output (3) lying in a light output plane (32). The light reflective wall is defined as a portion of the internal surface of an ellipsoid. The focal axis (25) of the ellipsoid has a determined angle CC with respect to an axis (V) perpendicular to the light output plane (32). The light reflective wall (21) is the portion of the ellipsoid, which is taken between the most remote point (24) of the ellipsoid from the light output plane and the light output plane (32). The invention further relates to a luminaire which comprises such a reflector and a light source.

7 Claims, 6 Drawing Sheets

LUMINAIRE AND REFLECTOR

TECHNICAL FIELD

The invention relates to a luminaire, more specifically to a ceiling washer, which comprises a light source and a complex-shaped reflector. The invention also relates to said reflector per se.

BACKGROUND OF THE INVENTION

Some ceiling luminaires are known from the prior art. For instance, an asymmetric luminaire, known under the trade name Adante by Philips, comprises a reflector and a light source. The reflector is a cylinder partly generated by an ellipse arc. The reflector is directed towards the ceiling. When seen from above, the light output surface is square. An adjustable shutter removes the unwanted light on the mounting wall.

SUMMARY OF THE INVENTION

It is an object of embodiments of the invention to provide a luminaire which has a sensibly round light beam.

It is another object of embodiments of the invention to provide a luminaire which is thin, without imparting the light distribution.

It is a further object of embodiments of the invention to provide a luminaire with reduced heating.

Another object of embodiments of the invention is to provide a luminaire wherein the useful life of the light source is improved.

A further object of embodiments of the invention is to provide an asymmetrical ceiling washer luminaire which redirects the light rays going towards the wall, from the wall towards the ceiling in order to increase the efficiency.

To this end, an embodiment of the invention proposes a reflector comprising a light reflective wall and a light output lying in a light output plane, the light reflective wall being defined as a portion of the internal surface of at least one ellipsoid, the focal axis of which has a non-zero angle $\alpha$ with respect to an axis perpendicular to the light output plane.

Another embodiment of the invention proposes a luminaire, more specifically an asymmetrical ceiling washer luminaire, which comprises a light source and a reflector as described above.

These and other aspects, features and advantages of the invention will become apparent to those skilled in the art upon reading the disclosure provided here in connection with the attached drawings. The detailed description, while indicating preferred embodiments of the invention, is only given by way of illustration.

BRIEF DESCRIPTION OF THE DRAWINGS

The invention will now be described in more details by way of example with reference to the accompanying drawings, in which.

DETAILED DESCRIPTION OF THE INVENTION

Figure 1:
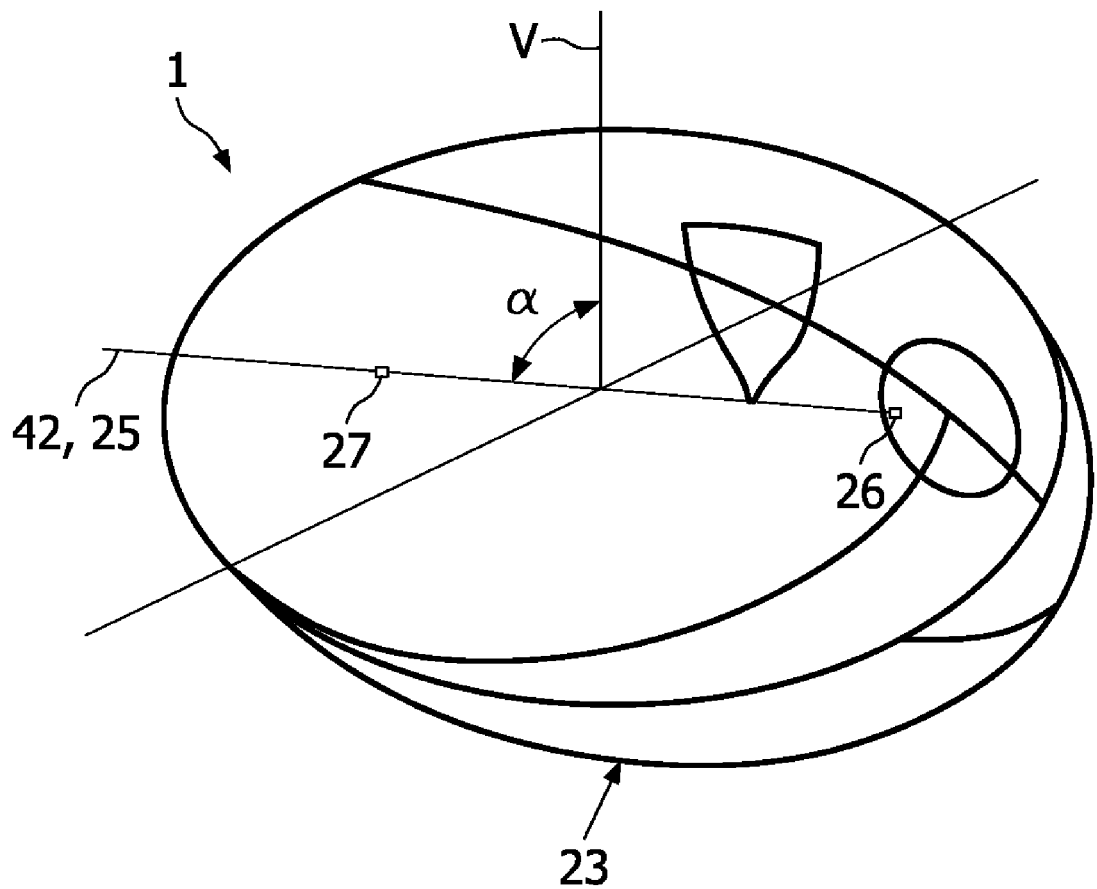
FIG. 1 shows a perspective view of a first embodiment of an ellipsoid reflector.

It must be noted that as used in this specification and the appended claims, the singular forms "a", "an", and "the" include plural referents unless the context clearly dictates otherwise. Unless defined otherwise, all technical and scientific terms herein have the same meaning as commonly understood by one of ordinary skill in the art to which this invention belongs.

Because the invention makes use of an ellipsoid reflector, the basic notions of ellipse and ellipsoid geometry are given below as a reminder.

An ellipse is the locus of points on a plane where the sum of the distances from any point on the curve to two fixed points is constant. The two fixed points are called foci usually denoted $F_1$ and $F_2$. The line that passes through the foci $F_1, F_2$, is called the focal axis. The line segment which is borne by the focal axis and terminates on the ellipse, is called the major axis. The line segment which is borne by the right bisector of the major axis and terminates on the ellipse, is called the minor axis. The intersection of the major axis and the minor axis is called the center of the ellipse. The semimajor axis a is one half the major axis: the line segment from the center, through a focus, and to the edge of the ellipse. Likewise, the semiminor axis b is one half the minor axis. The equation of an ellipse which is centered at the origin of a direct orthonormal base is:

$$\frac{x^2}{a^2} + \frac{y^2}{b^2} = 1 \qquad \text{(Eq. 1)}$$

The shape of an ellipse can be expressed by a number called the eccentricity of the ellipse, conventionally denoted $\epsilon$. The eccentricity is a positive number less than 1 and greater than or equal to 0. An eccentricity of 0 implies that the two foci occupy the same point and that the ellipse is a circle. For an ellipse with semimajor axis a and semiminor axis b, the eccentricity is given by the following equation:

$$\varepsilon = \sqrt{1 - \frac{b^2}{a^2}} \qquad \text{(Eq. 2)}$$

The greater the eccentricity is, the larger the ratio of a to b, and therefore the more elongated is the ellipse. The distance from the center of the ellipse to either focus is denoted d. The distance d is also called the linear eccentricity of the ellipse; it is given by the following equation:

$$d = \epsilon \cdot a \qquad \text{(Eq. 3)}$$

Thus, the distance between the foci, denoted f, is given by:

$$f = 2 \cdot d = 2 \cdot \epsilon \cdot a \qquad \text{(Eq. 4)}$$

An ellipsoid is a three-dimensional analogue of an ellipse. The equation of an ellipsoid which is centered at the origin of a direct orthonormal base is:

$$\frac{x^2}{a^2} + \frac{y^2}{b^2} + \frac{z^2}{c^2} = 1 \quad \text{(Eq. 5)}$$

A particular kind of ellipsoid are scalene ellipsoid where each radius is different from the two others. For instance a>b>c.

The verb "to merge" and its derivatives, and the word "common", when relating to a point, for instance a focus of an ellipsoid, or to an axis, for instance a polar axis of an ellipsoid, shall mean that the point or the axis are identical or that they are in close vicinity in comparison with a characteristic length of the ellipsoid.

In an embodiment of the invention, a luminaire comprises a complex-shaped reflector and a light source. Embodiments of the invention will be described generally in the case of a ceiling washer luminaire. However these embodiments may be adapted to other washer luminaires, for instance a wall washer luminaire, by an appropriate rotation of the described embodiments.

First, the reflector will be described.

Figure 2A:
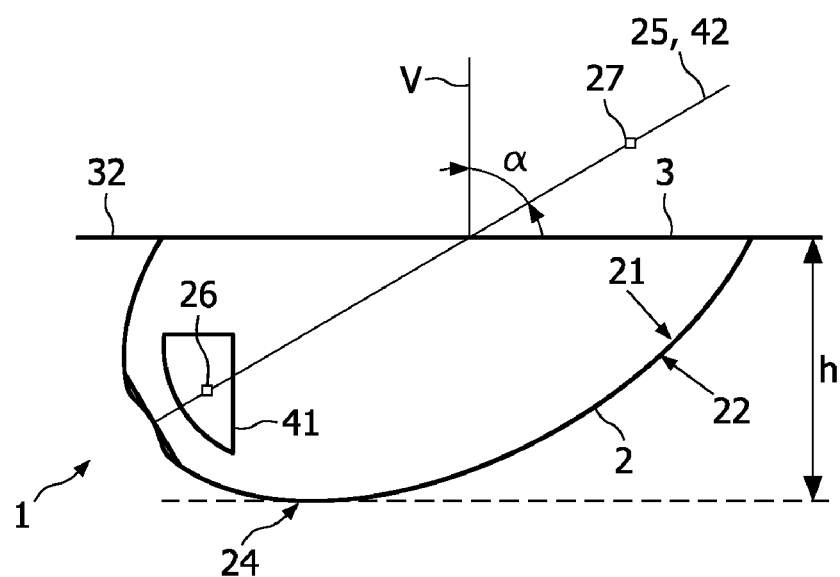
FIGS. 2A and 2B show respectively a straight cross section and a plan view from above of the ellipsoid reflector of FIG. 1.
Figure 2B:
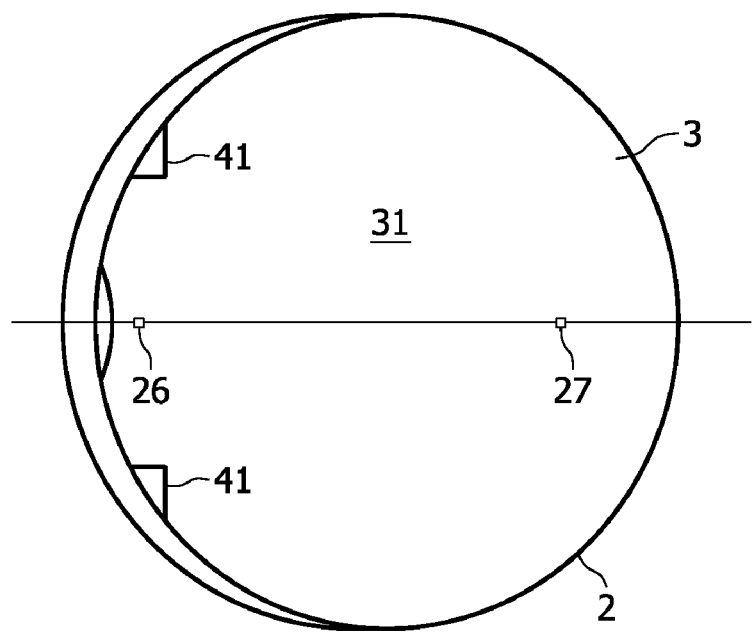

In a first embodiment which is depicted on FIGS. 1 and 2, a reflector 1 comprises a wall 2 and a light output 3. The light output 3 is an opening 31 in the upper part of the reflector 1 through which the light rays go in order to illuminate a ceiling. The light output lies in a light output plane 32. The light rays follow either a direct path from a light source that may be positioned inside the reflector 1 through the light output 3, or a path which comprises one or more reflections on the reflector 1 towards the light output 3. The wall 2 of the reflector 1 comprises an inner surface 21 and an outer surface 22. The inner surface has a determined shape and it is light reflective. The inner surface 21 of the wall 2 will be called the light reflective wall. The outer surface 22 of the reflector 1 may have any shape, for instance a shape similar to that of the light reflective wall, and it may be used for aesthetic purposes (coloration, surface aspect . . . ).

The light reflective wall is defined as the portion 23 of the surface of an ellipsoid, said portion being taken between the most remote point 24 of the ellipsoid from the light output plane 32 and the light output plane 32. In other words, the ellipsoid cap 23 below the light output plane 32 is the light reflective wall 2. Depending on the position of the luminaire with respect to the ceiling which it is desired to illuminate, the focal axis 25 of the ellipsoid has a determined angle α with respect to an axis V perpendicular to the light output plane 32.

If the light output plane is horizontal, then said axis V is a vertical axis.

The light output 3 has the same shape as the intersection between the ellipsoid and the light output plane 32. In general, this intersection defines an ellipse.

In a further embodiment, said ellipsoid is a scalene ellipsoid.

In an embodiment of the invention, the ellipse-shaped light output 3 has an eccentricity $\epsilon_{output}$ lower than 0.45. Taking Equation 2 into account, this implies that the ratio of b to a of the light output ellipse is higher than 0.9. In other words, the shape of the light output is close to a circle. In an embodiment of the invention, the ratio of b to a of the ellipse-shaped light output is higher than 0.95 or even than 0.99, which correspond to an eccentricity respectively lower than approximately 0.3 or 0.15. The shape of the light output 3 partly determines the shape of the light beam. A circular light output makes it easier to achieve a round light beam.

The reflector further comprises lamp holes 41. In an embodiment, the lamp holes 41 are positioned in the reflector 1 so that the axis 42 of the light beam is merged with the focal axis 25 of the ellipsoid reflector 1. In another embodiment, the light source housing 41 is positioned in the reflector 1 so that the centre of the light source 4 is located at a first focus 26 of the ellipsoid reflector 1. In that case, all the light rays emitted by the light source 4 will either go directly through the light output 3, or reflect on the reflector 1 and go towards the second focus 27 of the ellipsoid reflector, or near to said second focus.

In a preferred embodiment of the invention, the light output plane 32 cuts the ellipsoid between the first focus 26 and the second focus 27 of the ellipsoid. The first focus 26 is located inside the reflector 1, whereas the second focus 27 is located outside the reflector 1. Thus, any light ray in the vertical plane containing the focal axis which comes from the first focus and intercepts the reflective surface 21 of the reflector 1 will be reflected outside of the reflector 1 towards near the second focus 27.

Figure 3:
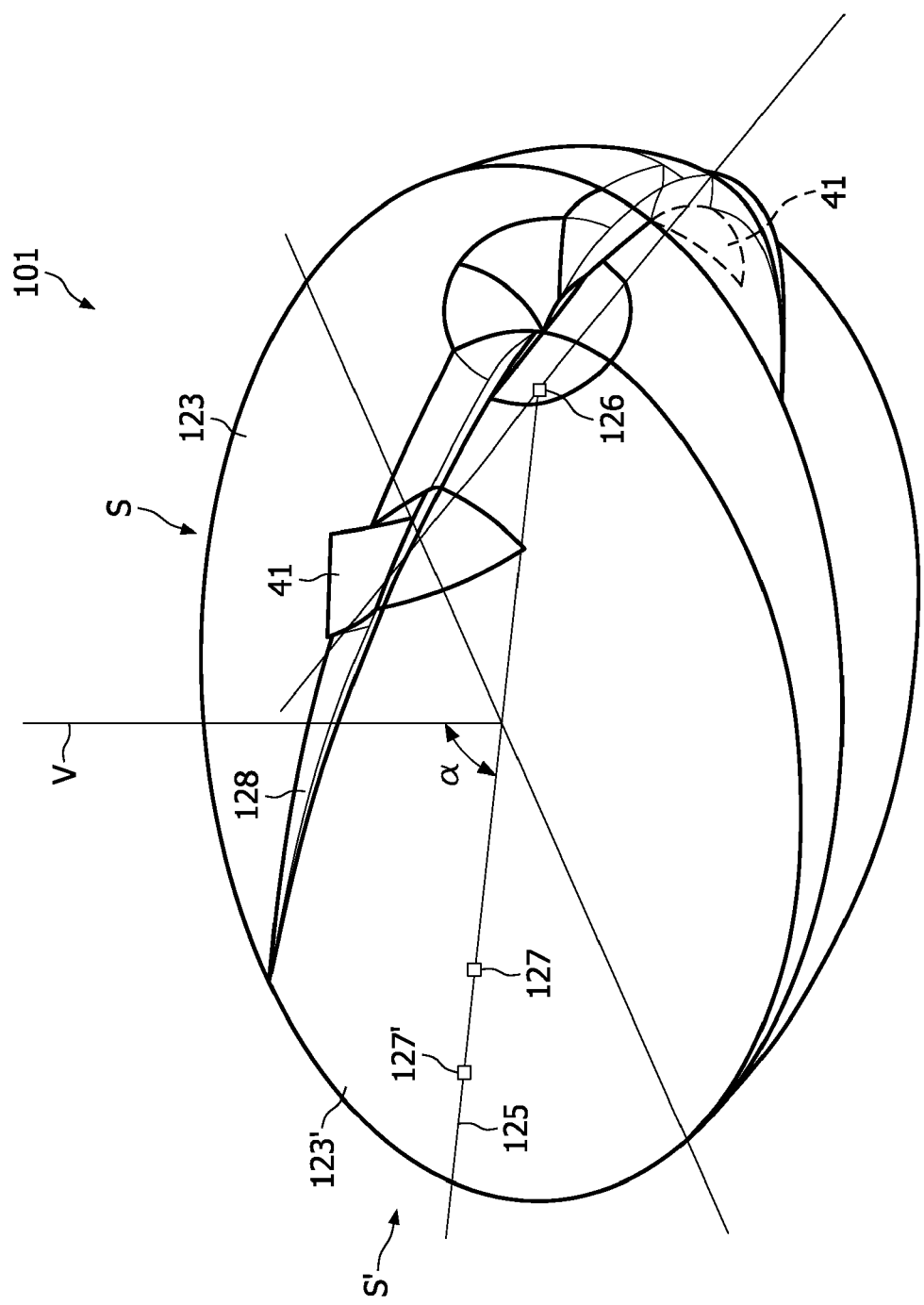
FIG. 3 shows a perspective view of a second embodiment of an ellipsoid reflector.
Figure 4A:
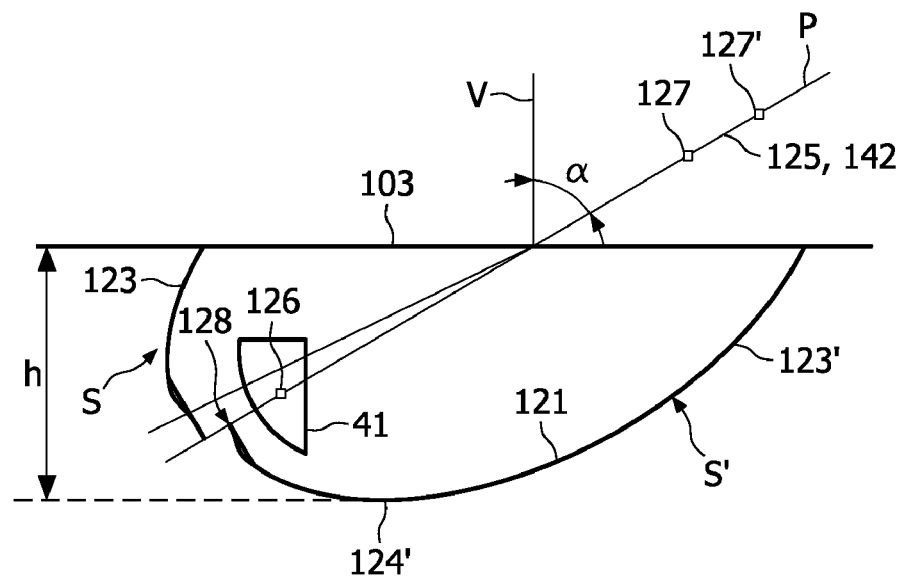
FIGS. 4A, 4B and 4C show respectively a straight cross section, a plan view from above and a plan view from the front of the ellipsoid reflector of FIG. 3.
Figure 4B:
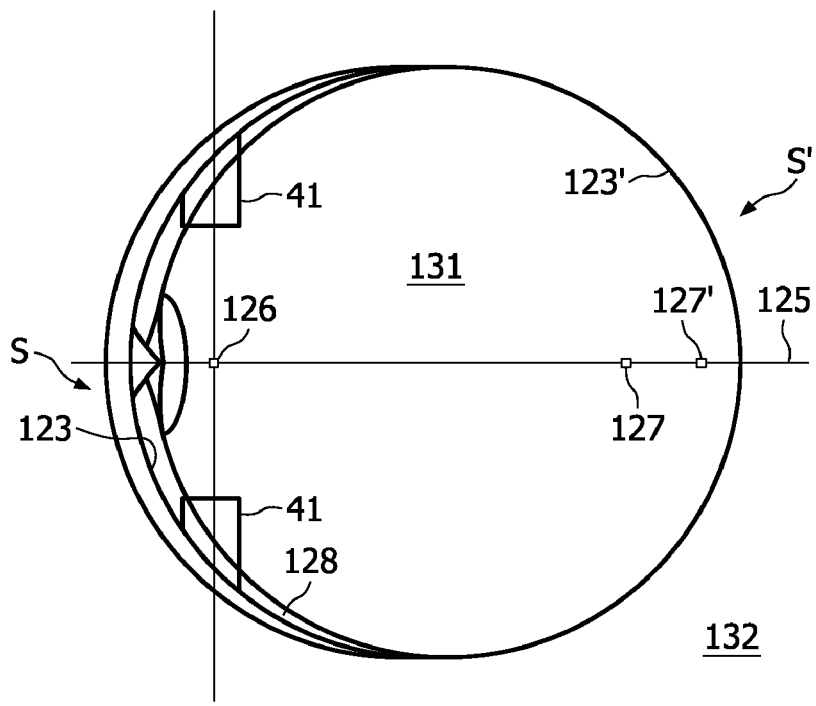
Figure 4C:
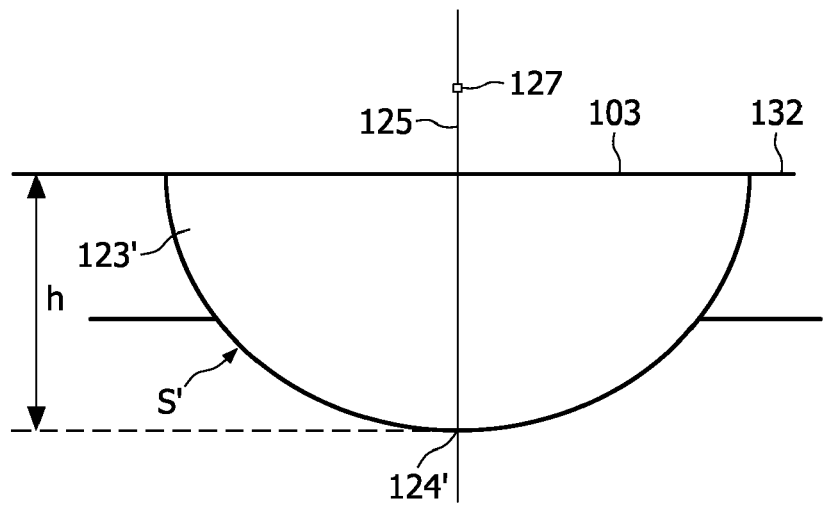
Figure 5:
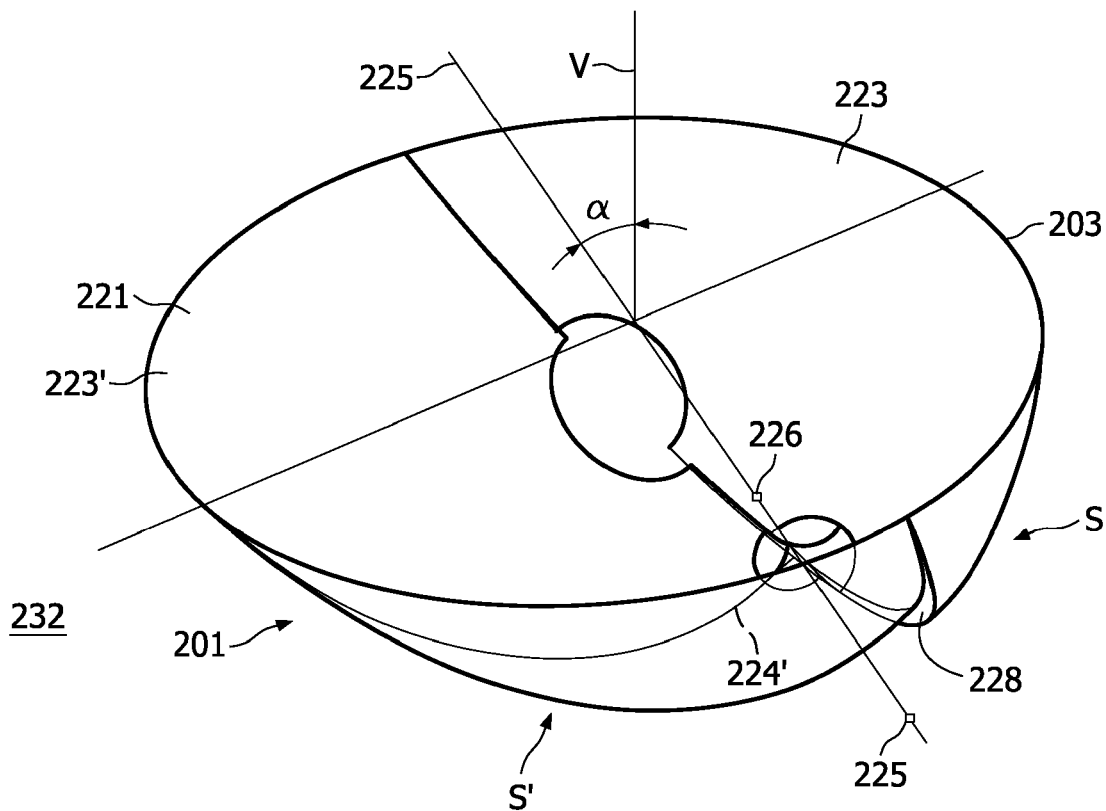
FIG. 5 shows a perspective view of a third embodiment of an ellipsoid reflector.

In a second and third embodiments of the invention, as depicted on FIGS. 3 to 5, the light reflective wall 121,221 of the reflector 101,201 comprises a plurality of ellipsoid portions 123,123',223,223'. The differences between the embodiment of FIGS. 3 and 4 and the embodiment of FIG. 5 are the dimensions of the light output 103,203 and the tilt a of the reflector with respect to an axis perpendicular to the light output plane.

For a better understanding, the numbering of the features in FIGS. 3 to 5 is similar to the numbering which was used in FIGS. 1 and 2. The first figure of the number, 1 or 2, relates respectively to the embodiment of FIGS. 3 and 4, and to the embodiment of FIG. 5.

More specifically, the light reflective wall 121,221 is defined as a portion 123',223' of the internal surface of a lower ellipsoid S' integral with a portion 123,223 of the internal surface of an upper ellipsoid S. The focal axis 125,225 of said upper and lower ellipsoids S, S' is common between said ellipsoids, as well as the first focus 126,226. The second focus 127' of the lower ellipsoid S' is positioned on the common focal axis 125,225 beyond the second focus 127 of the upper ellipsoid S with respect to the common first focus 126,226. A focal plane P may be defined as follows: it is the plane which has the same angle α with respect to an axis V perpendicular to the light output plane 132,232 and which contains the common focal axis 125,225. Plane P is seen as a line on FIG. 4A. The surface portion 123',223', of the lower ellipsoid S' is taken between (i) the most remote point 124',224' of the lower ellipsoid S' from the light output plane 132,232, (ii) the focal plane P and (iii) the light output plane 132,232. The surface portion 123,223 of the upper ellipsoid S is taken between said focal plane P and the light output plane 132, 232.

An advantage of such an embodiment of the invention is that the overall height h of the reflector is smaller than a reflector which has the same light output dimensions and the same tilt but which is comprised of a single ellipsoid portion as in the first embodiment. In other words, when light output dimensions and tilt are fixed, the second and third embodiments provide a thinner reflector than the first embodiment.

In a preferred embodiment of the invention, the light output plane 132,232 passes between the foci 126,127'; 226 of the lower ellipsoid S'. The first focus 126,226 is located inside the reflector 101,201, whereas the second focus 127' is located outside the reflector 101,201.

As illustrated in FIGS. 3-5, the upper ellipsoid S and the lower ellipsoid S' may intersect. In that case, it is preferred that the light output plane 123,232 passes by or near the intersection of the upper ellipsoid S and the lower ellipsoid S'. This arrangement provides a good compromise between sufficient output surface, height of the reflector and beam management including cut-off in the wall direction. When there are more than one intersections between the upper ellipsoid S and the lower ellipsoid S', the light output plane 132,232 may be chosen so that the height h of the reflector 101,201 is minimal.

In an embodiment of the invention, the ratio of the focal distance f of the upper ellipsoid S to the focal distance f of the lower ellipsoid S' is in the range of 0.70 to 0.90, and more preferably close to 0.85. This is another aspect of the compromise between the height of the ellipsoid reflector and the output surface.

In a further embodiment of the invention, the linking surface 128,228 between the surface portion 123',223' of the lower ellipsoid S' and the surface portion 123,223 of the upper ellipsoid S is a surface portion of the focal plane P.

As in the first embodiment, second and third embodiments of the reflector also comprise a light source housing 41. More details have already been given above.

In most embodiments, the tilt cc of the ellipsoid, i.e. the angle of the focal axis with respect of an axis perpendicular to the light output plane, is in the range of 30° to 75°.

The reflector may be manufactured with various heat resistant materials. Heat resistance will be considered as sufficient when the reflector does not loose is reflectivity and its shape under thermal stress resulting from operation of the luminaire. Preferred materials include metal, metal alloys, thermoplastics or thermoset plastics. Preferably, the reflector is manufactured by moulding or stamping. Moulding techniques are well known by the person having ordinary skill in the art, such as injection moulding or thermoforming. Stamping techniques are also well known by the person having ordinary skill in the art, such as embossing, metal forming or deep drawing.

It is possible to manufacture a reflector by sealing or welding together two hemi-reflectors, i.e. two halves of a complete reflector. This approach has several advantages. First, the moulds or stamps for making a hemi-reflector are simpler to design and second, hemi-reflectors are easier to store than complete reflectors.

The light reflectiveness of the reflector's inner surface may be achieved either by choosing appropriately the material for manufacturing the reflector, or by surface treating the inner surface of the reflector, or both. Surface treatment may be a mechanical treatment, or a chemical treatment, coating, spraying or other known techniques. The results of chemical surface treatments may be improved when they are applied to hemi-reflectors rather than on complete reflectors.

Figure 6:
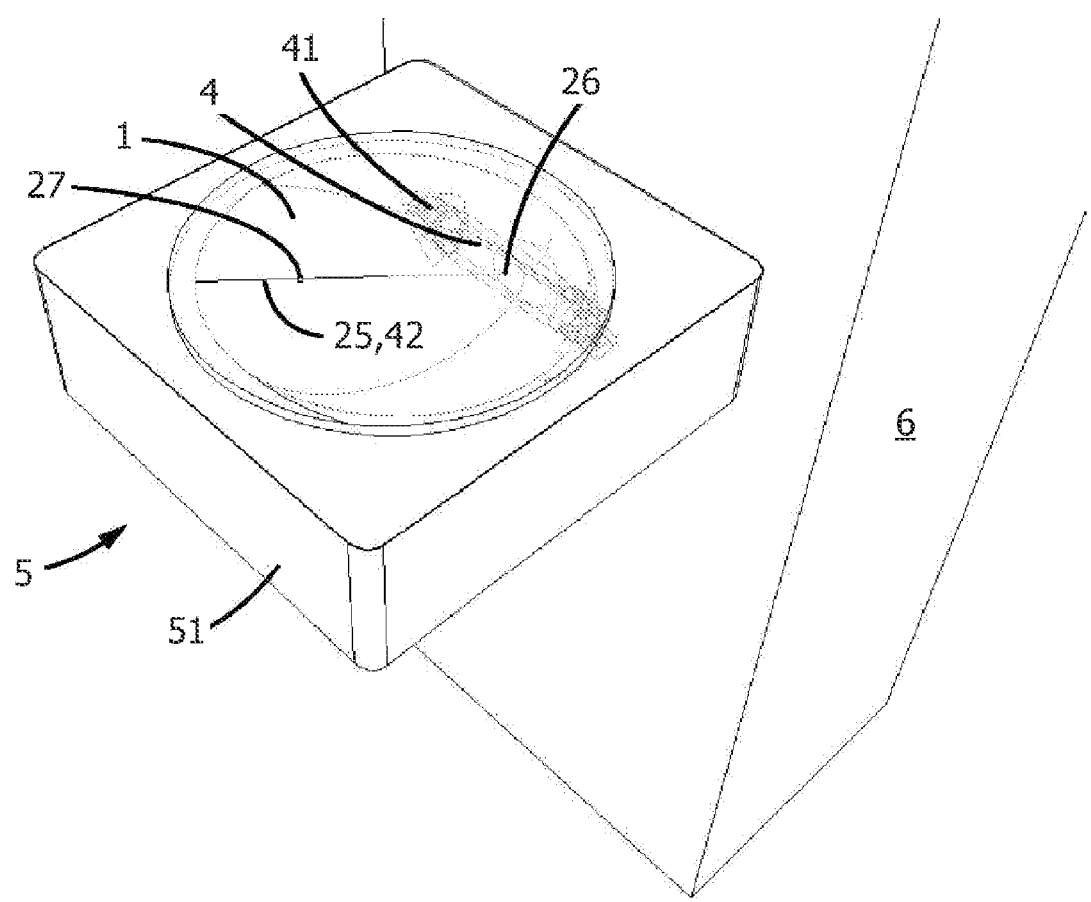
FIG. 6 shows a perspective view of an embodiment of a luminaire which comprises an ellipsoid reflector.

As illustrated on FIG. 6, another embodiment of the invention relates to a luminaire 5, in particular a ceiling washer luminaire, which comprises a reflector 1 as detailed in the foregoing description, and a light source 4. In a preferred embodiment, the light source 4 is positioned substantially at the first focus 26 of the reflector 1. The reflector 1 may be protected by a casing 51.

The reflector may be positioned perpendicular to a wall 6 in order to illuminate a ceiling located above. Of course, the luminaire will also comprise usual installation and operation means such as fixation means or power supply means.

The foregoing description of preferred embodiments of the invention is not intended to be exhaustive or to limit the invention to the disclosed embodiments. Various changes within the scope of the invention will become apparent to those skilled in the art and may be acquired from practice of the invention.

The invention claimed is:

1. A reflector comprising a light reflective wall and a light output lying in a light output plane, the light reflective wall being defined as a portion of the internal surface of at least one ellipsoid, the focal axis of which has a non-zero angle $\alpha$ with respect to an axis (V) perpendicular to the light output plane, wherein the light reflective wall is defined as a portion of the internal surface of a lower ellipsoid (S') integral with a portion of the internal surface of an upper ellipsoid (S), said upper and lower ellipsoids having a common focal axis and a common first focus, the second focus of the lower ellipsoid (S') being positioned on the common focal axis beyond the second focus of the upper ellipsoid (S) with respect to the common first focus, the surface portion of the lower ellipsoid (S') being taken between (i) the most remote point of said lower ellipsoid from the light output plane, and (ii) the focal plane (P) which has the same angle $\alpha$ with respect to the axis (V) perpendicular to the light output plane than said common focal axis and which contains said common focal axis and (iii) said light output plane, the surface portion of the upper ellipsoid (S) being taken between said focal plane (P) and the light output plane.

2. The reflector of claim 1 wherein said non-zero angle $\alpha$ ranges from 30° to 75°.

3. The reflector of claim 1 wherein the intersection between the ellipsoid and the output plane defines an ellipse having an eccentricity lower than 0.45.

4. The reflector of claim 1, wherein said light output plane passes between the foci (126,127') of the lower ellipsoid (S').

5. The reflector of claim 1, wherein said light output plane passes by an intersection between said upper and lower ellipsoids (S,S'), such that the height (h) of the reflector is minimal.

6. The reflector of claim 1, wherein the linking surface (128;228) between the surface portion (123';223') of the lower ellipsoid (S') and the surface portion (123;223) of the upper ellipsoid (S) is a surface portion of said focal plane (P).

7. A luminaire, comprising a reflector (1) according to claim 1 and a light source (4) positioned substantially at the first focus (26) of the reflector.

\* \* \* \* \*